(12) United States Patent
Endo et al.

(10) Patent No.: US 6,702,293 B2
(45) Date of Patent: Mar. 9, 2004

(54) SEAL MEMBER MOUNTED BETWEEN CYLINDER HEAD COVER AND IGNITION PLUG TUBE

(75) Inventors: Kazutoyo Endo, Kawagoe (JP); Norimasa Matsui, Fujisawa (JP)

(73) Assignees: Mahle Tennex Corporation, Tokyo (JP); Keeper Co., Ltd., Kanagawa (JP)

( * ) Notice: Subject to any disclaimer, the term of this patent is extended or adjusted under 35 U.S.C. 154(b) by 0 days.

(21) Appl. No.: 10/092,731

(22) Filed: Mar. 8, 2002

(65) Prior Publication Data
US 2002/0130472 A1 Sep. 19, 2002

(30) Foreign Application Priority Data

Mar. 9, 2001 (JP) ........................................ 2001-066059
Mar. 4, 2002 (JP) ........................................ 2002-057539

(51) Int. Cl.$^7$ .............................. F16J 15/11; F16J 15/32
(52) U.S. Cl. ....................... 277/500; 277/503; 277/549; 277/572; 277/577
(58) Field of Search .................... 277/500, 503–505, 277/549, 551, 552, 561, 562, 566, 572, 573, 574, 576, 577, 586, 591; 123/634, 635, 195 C, 90.38

(56) References Cited

U.S. PATENT DOCUMENTS

| | | | | |
|---|---|---|---|---|
| 4,448,461 A | * | 5/1984 | Otto | 384/482 |
| 4,484,751 A | * | 11/1984 | Deuring | 277/574 |
| 5,167,419 A | * | 12/1992 | Robertson | 277/552 |
| 5,228,420 A | * | 7/1993 | Furuya et al. | 123/90.38 |
| 5,299,677 A | * | 4/1994 | Caillaud et al. | 277/565 |
| 5,329,898 A | * | 7/1994 | Nelson et al. | 123/195 C |
| 5,462,288 A | * | 10/1995 | Hering et al. | 277/565 |
| 5,462,889 A | * | 10/1995 | Tsukada et al. | 438/385 |
| 5,771,870 A | * | 6/1998 | Satou et al. | 123/635 |
| 6,227,186 B1 | * | 5/2001 | Seidl et al. | 123/634 |

FOREIGN PATENT DOCUMENTS

| JP | A1 62-195643 | | 12/1987 |
|---|---|---|---|
| JP | 409133068 A | * | 5/1997 |

* cited by examiner

Primary Examiner—Anthony Knight
Assistant Examiner—Vishal Patel
(74) Attorney, Agent, or Firm—Foley & Lardner

(57) ABSTRACT

A seal member adapted to be mounted between a cylinder head cover and an ignition plug tube comprises a mount portion interposed radially movably between an upper surface of an annular stepped portion formed around an opening of the cylinder head cover for insertion of the ignition plug tube and a baffle plate. A first seal portion and a second seal portion project radially outward and inward, respectively, from the mount portion to be brought into contact with a peripheral surface of the annular stepped portion and the ignition plug tube, respectively. The second seal portion can be elastically deformed following relative radial movements between the mount portion and the ignition plug tube.

9 Claims, 7 Drawing Sheets

SEAL MEMBER MOUNTED BETWEEN CYLINDER HEAD COVER AND IGNITION PLUG TUBE

BACKGROUND OF THE INVENTION

1. Field of the Invention

The present invention relates to a seal member adapted to be mounted between a cylinder head cover and an ignition plug tube.

2. Description of the Prior Art

Conventionally, a cylinder head of an engine is formed with an ignition plug tube insertion opening for insertion and mounting of an ignition plug tube. In the case where a cylinder head cover has a configuration that it lies over a substantially entire upper portion of a cylinder head, an ignition plug tube must be mounted inside the cylinder head cover and opened to the outside. With an engine of such type, a seal member is ordinarily mounted between the ignition plug tube and the cylinder head cover to seal blowby gas and scattered oil in the cylinder head cover from the outside.

FIG. 6 shows a conventional seal member 101 mounted between a cylinder head cover 102 and an ignition plug tube 108. The seal member 101 is formed of rubber, the elasticity of which presses a lip portion 106 against an underside of the cylinder head cover 102 to provide sealing between the cylinder head cover 102 and the ignition plug tube 108. In order to preserve the sealing performance, the seal member 101 must be preferably and closely contacted with the cylinder head cover 102 and the ignition plug tube 108.

However, when a distance L between an upper end of the ignition plug tube 108 and the surface of the cylinder head cover 102 contacting the seal member varies due to manufacturing reasons, and vibrations and thermal deformation of the cylinder head cover, closely contacted state between the lip portion 106 of the seal member 101 and the cylinder head cover 102 is degraded in quality, and hence the sealing performance becomes insufficient.

A seal construction for improving the sealing performance has therefore been developed, an example of which is disclosed in JP-A-62-195643.

In the disclosed seal construction, an annular stepped portion is provided around an ignition plug tube insertion opening of an cylinder head cover. The annular stepped portion has a peripheral surface, which extends in parallel with an outer peripheral surface of an upper end of the ignition plug tube at a location spaced from the outer peripheral surface. A seal member is mounted between the peripheral surface of the annular stepped portion and the outer peripheral surface of the ignition plug tube.

As shown in FIG. 7, the seal member 101 comprises a lip portion 116 extending annularly around the outer peripheral surface 108a of the ignition plug tube 108 to be pressed against the outer peripheral surface, an annular spring 110 provided on the lip portion 116 for pressing the same against the outer peripheral surface 108a of the ignition plug tube 108, a mount portion 117 mounted on the peripheral surface 104a of the annular stepped portion 104 of the cylinder head cover 102, and a bellows portion 118 connecting the mount portion 117 with the lip portion 116 and deformable so as to accommodate a change in spacing between the outer peripheral surface 108a of the ignition plug tube 108 and the peripheral surface 104a of the annular stepped portion 104.

In this seal construction, the seal member 101 is mounted on the peripheral surface 104a of the annular stepped portion 104 of the cylinder head cover 102, and the annular spring 110 presses the lip portion 116 against the outer peripheral surface 108a of the ignition plug tube over an entire periphery thereof. Accordingly, dispersion in distance between the cylinder head cover 102 and the ignition plug tube 108, as viewed in an axial direction of the ignition plug tube 108, does not affect the sealing performance therebetween. Further, even when the ignition plug tube 108 becomes somewhat eccentric relative to the peripheral surface 104a of the annular stepped portion 104, the sealing performance is not damaged since the bellows portion 118 deforms to accommodate the eccentricity.

However, since the conventional seal member shown in FIG. 7 comprises the bellows portion between the lip portion and the mount portion, the diametrical dimension is increased. Thus, there has been encountered a problem that the seal member and its surrounding structure are increased in size, and hence compact and lightweight device is unobtainable and freedom in design is impeded.

There has therefore been encountered a problem that, in the case where a cylinder head cover is formed of resin, there is a fear of the seal member falling off from the annular stepped portion due to thermal deformation of the cylinder head cover or the like.

SUMMARY OF THE INVENTION

It is an object of the invention to provide a seal member for solving the above-mentioned problems of the prior art.

To solve the above-mentioned problems, the invention provides a seal member adapted to be mounted between a cylinder head cover and an ignition plug tube, comprising a mount portion formed to be at least partially smaller in diameter than an inner diameter of a peripheral surface of an annular stepped portion formed around an opening of the cylinder head cover for insertion of the ignition plug tube, the mount portion being adapted to be interposed between an upper surface of the annular stepped portion and a baffle plate fused to an underside of the cylinder head cover to be radially movable, a first annular seal portion projecting radially outward from the mount portion to be brought into contact with the peripheral surface of the annular stepped portion, and a second annular seal portion projecting radially inward from the mount portion to be brought into contact with a peripheral surface of the ignition plug tube to be elastically deformable following relative radial movements between the mount portion and the ignition plug tube.

The seal member according to the invention having the above-described construction is interposed between the upper surface of the annular stepped portion of the cylinder head cover and the baffle plate to be surely mounted. Further, since the first seal portion and the second seal portion are brought into sealing contact with the peripheral surface of the annular stepped portion and the peripheral surface of the ignition plug tube over entire peripheries thereof, it is possible to provide a reliable sealing between the cylinder head cover and the ignition plug tube. For example, even when a position, in which the ignition plug tube is mounted, varies in an axial direction, the sealing performance is not damaged. When the ignition plug tube becomes eccentric relative to the peripheral surface of the annular stepped portion, the second seal portion is elastically deformed following such eccentricity and the mount portion moves radially. Accordingly, the change in a spacing between the ignition plug tube and the peripheral surface of the annular stepped portion, which is caused by the eccentricity, is accommodated and hence the sealing performance is maintained. The construction that the mount portion is thus radially movable brings about an advantage that the seal member can be made small in a diametrical dimension as compared with a conventional device provided with a bellows as shown in FIG. 7.

Preferably, the second seal portion is reinforced near an outer peripheral portion thereof with a reinforcement ring. With such structure, it is possible to prevent abnormal deformation of the seal member caused upon insertion of an ignition plug tube into a cylinder cover and at the time of an increase in inner pressure in the cylinder cover. It is also possible to restrict a direction, in which the seal member is deformed, when the ignition plug tube becomes eccentric. Further, since the portion to be deformed is divided into the portion of the second seal portion located on an inner periphery side with respect to the reinforcement ring and the mount portion located on an outer periphery side with respect to the reinforcement ring, it is possible to prevent occurrence of partially excessively deformed portions on the seal member.

Preferably, the first seal portion is formed to have a shape of a lip. By doing so, forces radially acting when the ignition plug tube becomes eccentric can be relaxed to facilitate radial movements of the mount portion, and there is no need of accurately prescribing dimensional tolerances of the annular stepped portion, which makes workability in assembly favorable. Also, a change in amount of sealing, caused by thermal deformation or the like, can be suitably accommodated.

A circumferentially continuous projection or circumferentially discrete projections may be formed on an end of the mount portion located on the side of the baffle plate to be brought into contact with the baffle plate. With such structure, a contact area between the mount portion and the baffle plate is reduced and hence a friction therebetween is reduced. It is therefore possible to facilitate radial movement of the mount portion while securely holding the mount portion between the upper surface of the annular stepped portion and the baffle plate. Further, since the holding force acting on the mount portion interposed therebetween is reduced, operation for fusing the baffle plate to the cylinder head cover is facilitated.

Such structure may be adopted that a circumferentially continuous annular projection or circumferentially discrete annular projections are formed on the cylinder head cover to extend from the upper surface of the annular stepped portion inwardly of the cylinder head cover, and an inner peripheral surface of the mount portion is fitted onto the annular projection or projections. With such structure, a state, in which the seal member is mounted, can be made stable.

Other objects, features and advantages of the invention will become apparent from the following description of embodiments of the invention made in conjunction with the accompanying drawings.

BRIEF DESCRIPTION OF THE DRAWINGS

Similar members and parts are denoted by similar reference numerals throughout all the drawings.

DESCRIPTION OF THE PREFERRED EMBODIMENTS

Figure 1:
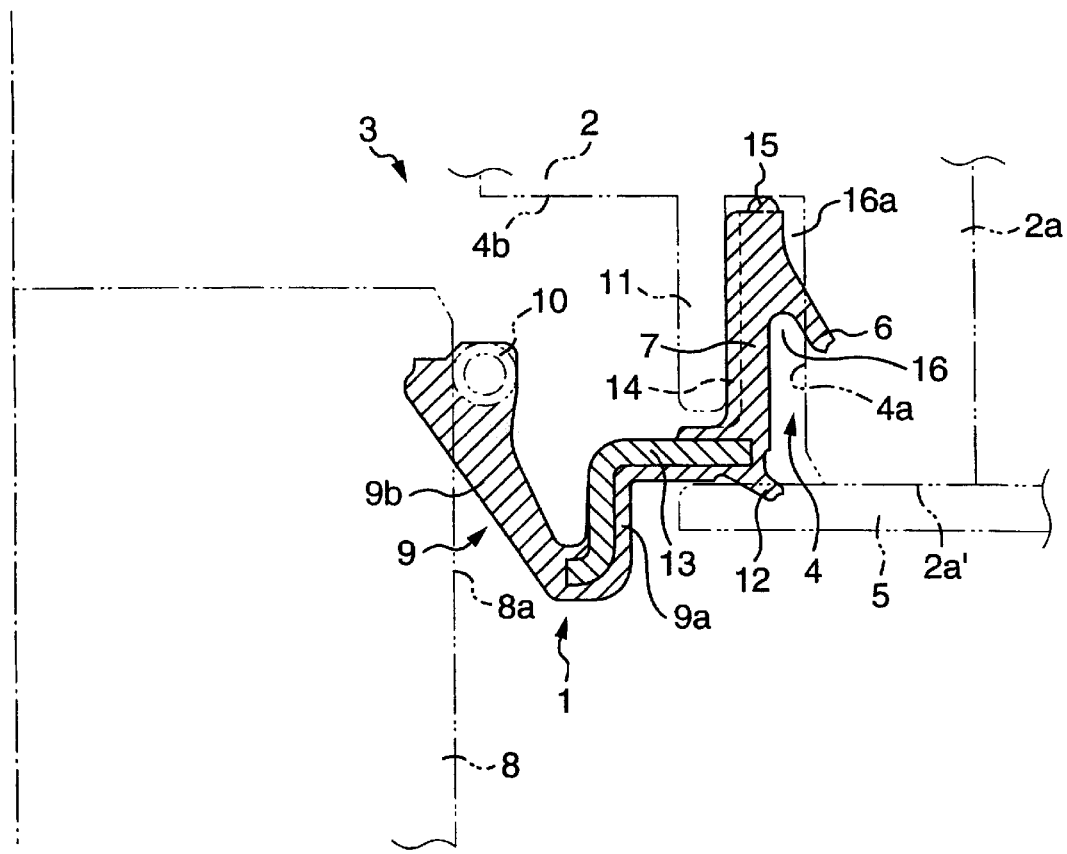
FIG. 1 is a side cross sectional view showing a seal member according to a first embodiment of the invention.
Figure 2:
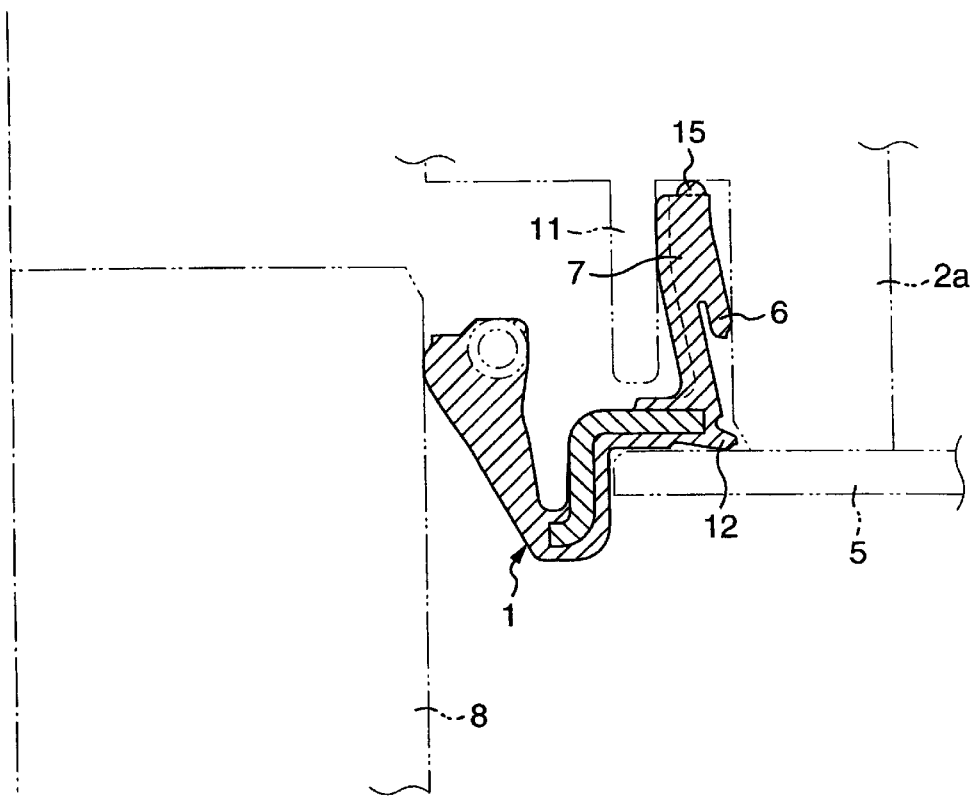
FIG. 2 is a side cross sectional view showing a state when the first embodiment of FIG. 1 is rendered eccentric.

FIG. 1 is a side cross sectional view showing a first embodiment of a seal member according to the invention, and FIG. 2 is a cross sectional view showing first embodiment in an eccentric state.

As shown in FIGS. 1 and 2, a cylinder head cover 2 of an engine is provided with an ignition plug tube insertion opening or an opening 3 for insertion of an ignition plug tube therethrough. Around the opening 3 is formed an annular stepped portion 4.

The annular stepped portion 4 is formed by providing a cylindrical wall or an annular wall 2a located on a somewhat radially outward side with respect to the opening 3 and extending around the same. The annular wall 2a projects inwardly of the cylinder head cover 2 (i.e., downwardly in FIG. 1) and surrounds an ignition plug tube 8. An inner peripheral surface of the annular wall 2a and that portion of an inner surface (i.e., a lower surface in FIG. 1) of the cylinder head cover 2, which is located on an diametrically inner side with respect to the annular wall 2a, constitute the annular stepped portion 4. Thus, the annular stepped portion 4 has a peripheral surface 4a corresponding to the inner peripheral surface of the annular wall 2a and an upper surface 4b corresponding to that portion of an inner surface of the cylinder head cover 2, which is located on the diametrically inner side with respect to the annular wall 2a.

A seal member 1 is fitted and mounted inside the annular stepped portion 4, and then a baffle plate 5 is fused to a lower surface 2a' of the cylinder head cover 2, i.e., a lower surface of the annular wall 2a. In this manner, the seal member 1 is mounted between the cylinder head cover 2 and the baffle plate 5.

The seal member 1 comprises a mount portion 7 formed to be at least partially smaller in diameter than an inner diameter of the peripheral surface 4a of the annular stepped portion 4 and interposed between the upper surface 4b of the annular stepped portion 4 and the baffle plate 5 to be movable in a diametrical direction, a first annular seal portion 6 held by the mount portion 7 and projects radially outwards from the mount portion 7 to be brought into contact with the peripheral surface 4a of the annular stepped portion 4, and a second annular seal portion 9 projecting radially inwards from the mount portion 7 to be brought into contact with a peripheral surface 8a of the ignition plug tube 8.

The first seal portion 6 is formed to have a shape of a lip which obliquely extends radially outwards and downwards to contact at its tip end with the peripheral surface 4a of the annular stepped portion 4. The second seal portion 9 is formed of a flexible material to be elastically deformable following relative radial movements between the mount portion 7 and the ignition plug tube 8.

The second seal portion 9 is formed into a shape having an outer peripheral portion 9a extending radially inwards from the mount portion 7 by a small distance and then bent axially downwards, and an inner peripheral portion 9b obliquely extending radially inwards and upwards from a radially inner end of the outer peripheral portion 9a.

Mounted on a tip end of the second seal portion 9 is an annular spring 10 acting to press the tip end of the second seal portion 9 against the peripheral surface 8a of the ignition plug tube 8. That portion of the mount portion 7, which contacts with the upper surface 4b of the annular stepped portion 4, is provided with a plurality of bump-shaped projections 15 spaced from one another circumferentially of the mount portion 7. Preferably, the projections 15 are embossed projections. The mount portion 7 is provided at its lower end with a projection 12, which projects in the same direction as the first seal portion 6, that is, obliquely projects radially outwards and downwards to form a lip shape and continuously annularly extends circumferentially of the mount portion 7.

One or both of the projections 12 and 15 may be omitted. However, with the provision of the projections 12 and 15, there is obtained an advantage that an interfacial friction of the mount portion 7 with the baffle plate 5 and the upper surface 4b of the annular stepped portion 4 is reduced and hence radial movement of the mount portion 7 is facilitated.

It is of course possible to constitute the projection 15 as an annular projection continuing circumferentially of the mount portion 7 or to constitute the projection 12 from a plurality of lip-shaped projections spaced apart from one another circumferentially of the mount portion 7. That is, these projections may be continuous or discontinuous in the circumferential direction.

When the ignition plug tube 8 is caused to be in an eccentric or off-centered state relative to the cylinder head cover 2 in a rightward direction, for example, from a state shown in FIG. 1, the second seal portion 9 of the seal member 1 is pushed in the eccentric direction, i.e., rightwardly. More specifically, that portion of the second seal portion 9, which contacts with the ignition plug tube 8, is pressed to be deformed, and the pressing force is transmitted to the mount portion 7 connected to the second seal portion 9, so that the mount portion 7 is moved in the diametrical or rightward direction. At this time, the first seal portion 6 in the form of a lip is pushed toward the peripheral surface 4a of the annular stepped portion 4 and deformed.

The above-described deformation of the second seal portion 9 and radial movement of the mount portion 7 cause the eccentricity of the ignition plug tube 8 to be accommodated or absorbed, so that the sealed condition is maintained.

In the present embodiment, a reinforcement ring 13 is provided near the outer peripheral portion 9a of the second seal portion 9, as shown in FIG. 1. That is, the ring 13 is provided at that portion of the second seal portion 9, which is located radially outwardly with respect to a substantially central position between the ignition plug tube 8 and the mount portion 7. With such structure, it is possible to prevent abnormal deformation of the seal member 1 due to pressure difference between the inside and outside of the seal member 1. Also it is possible to improve sealing performance by restricting deformation of the seal member when the ignition plug tube 8 becomes an eccentric state as shown in FIG. 2.

In the present embodiment, a projection 11 is provided to extend downwardly from the upper surface 4b of the annular stepped portion 4 and to face the reinforcement ring 13. The projection 11 may be formed as an annular projection continuing circumferentially of the annular stepped portion 4 or as annular projections arranged to define a discrete or discontinuous annular configuration circumferentially of the annular stepped portion. Formed between the projection 11 and the peripheral surface 4a of the annular stepped portion 4 is a groove 16, into which the mount portion 7 is inserted to fit an inner peripheral surface of the mount portion 7 onto the projection 11. With such arrangement, the seal member 1 can be made further stable in a mounted condition. Further, even when the second seal portion 9 is deformed axially upon insertion of the ignition plug tube 8, the reinforcement ring 13 and the projection 11 abut against each other to suppress deformation of more than a predetermined amount. Thus, the sealing performance of the second seal portion 9 can be maintained.

When the mount portion 7 is moved radially according to an eccentricity caused on the ignition plug tube 8, the mount portion 7 may slide as a whole or only a portion of the mount portion 7 located on the side of the baffle plate 5 may slide. In the case where the mount portion 7 slides as a whole, the first seal portion 6 in the form of a lip is deformed and the entire mount portion 7 is moved radially. Further, in the case where only a portion (lower portion in FIG. 1) of the mount portion 7 located on the side of the baffle plate 5 slides, the mount portion 7 flexes (distorts) radially, whereby only a lower portion of the mount portion 7 is moved radially. It is possible to cause both of the sliding movements described above, i.e., radial sliding of the entire mount portion 7 and radial sliding of the portion (lower portion in FIG. 1) of the mount portion 7 located on the side of the baffle plate 5.

While the first seal portion 6 in the form of a lip and the projection 12 in the first embodiment are inclined in radially outward and downward directions, the directions of inclination are not limited thereto. However, in the case where the first seal portion 6 and the projection 12 are both in the form of a lip, it is possible by making them inclined in the same direction to maintain the sealing performance favorable even when pressure in the cylinder head cover 2 becomes either positive or negative relative to the atmospheric pressure.

Figure 3:
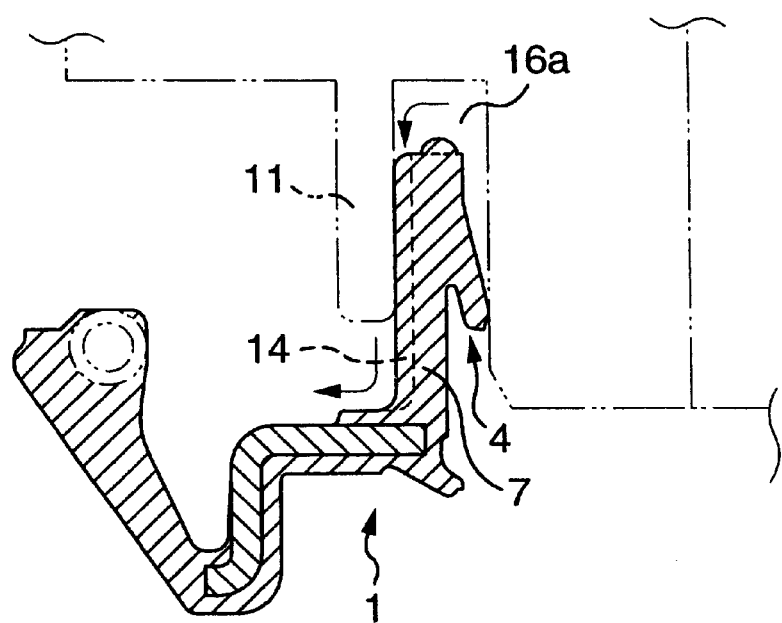
FIG. 3 is a cross sectional view showing a state when the seal member according to the first embodiment is assembled.

The length of the projection 11 is optional. However, if the length is set to a length projecting up to a position, in which a root of the first seal portion 6 is located, the radial movement of the mount portion 7 is not prevented by the projection 11. Further, when the projection 11 is formed to be opposed to the reinforcement ring 13 provided near the outer peripheral portion of the second seal portion 9, the reinforcement ring 13 and the projection 11 abut against each other to suppress deformation of more than a predetermined amount to thereby enable to preferably maintain sealing performance of the second seal portion 9 even when the second seal portion 9 is deformed upon insertion of the ignition plug tube 8. In the case where the projection 11 is formed as a continuous, annular projection, a closed space 16a enclosed by the first seal portion 6, the mount portion 7, the peripheral surface 4a of the annular stepped portion 4, and the projection 11 is formed at the time of assembly when the seal member 1 is inserted into the groove 16 between the peripheral surface 4a of the annular stepped portion 4 and the projection 11. Accordingly, insertion of the seal member 1 into the groove 16 becomes difficult or insufficient. Thus, as shown in FIG. 3 particularly clearly, it is preferable to form on an inner peripheral side of the mount portion 7 a recess 14 extending axially of the mount portion 7 so that an air in the closed space 16a may be allowed to be discharged to the atmosphere through the recess 14. That is, it is preferable to allow an air to be discharged to the atmosphere as shown by arrows in FIG. 3 at the time of assembly.

Figure 4:
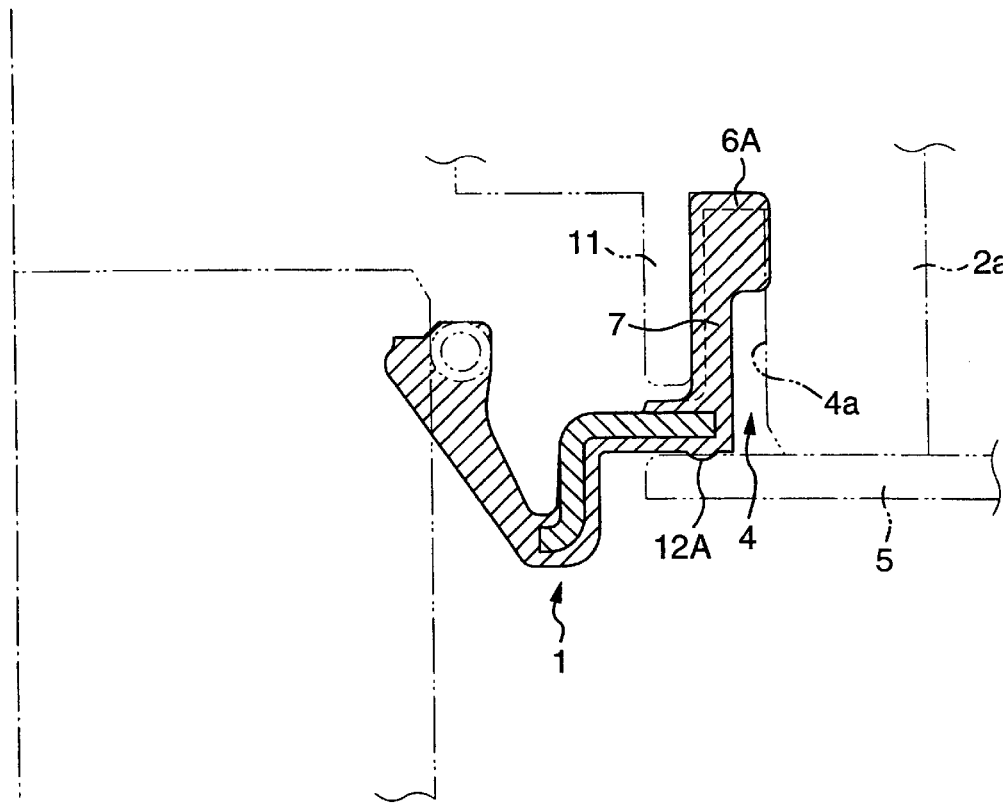
FIG. 4 is a side cross sectional view showing a seal member according to a second embodiment of the invention.

In a second embodiment shown in FIG. 4, a first seal portion 6A is constructed as a projection in the form of a rectangular ring projecting radially outward from the mount portion 7 and contacting with the peripheral surface 4a of the annular stepped portion 4. The projection may be in the form of an O-ring or the like. Although the mount portion 7 in the second embodiment is difficult to move radially as a whole, a portion of the mount portion 7 located on the side of the baffle plate 5, i.e., a lower portion of the mount portion 7 can be moved radially. Thus, the portion of the mount portion 7 located on the side of the baffle plate 5 moves radially when the ignition plug tube 8 is rendered eccentric.

In the second embodiment, a projection 12A is provided instead of the lip-shaped projection 12 in the first embodiment. More specifically, the projection 12A is provided on an end of the mount portion 7 located on the side of the baffle plate 5 to be brought into contact with the baffle plate 5. Thus interfacial friction between the mount portion 7 and the baffle plate 5 is reduced to facilitate radial movement of the mount portion 7. The projection 12A may be an annular projection continuing circumferentially of the mount portion 7 or annular projections discontinuing circumferentially of the mount portion 7. The projection 12A may be made as embossed projections.

Figure 5:
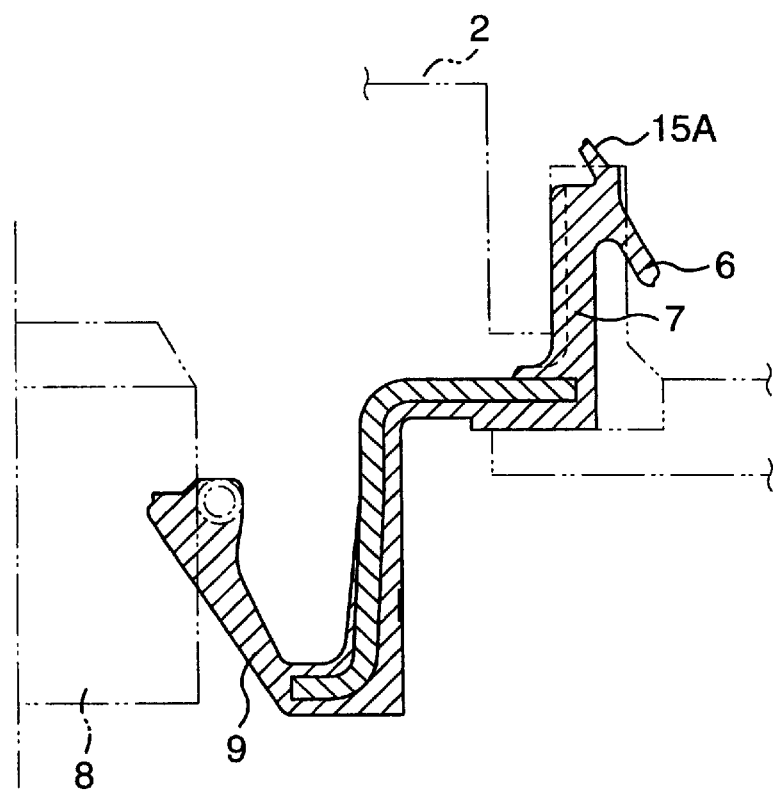
FIG. 5 is a side cross sectional view showing a seal member according to a third embodiment of the invention.
Figure 6:
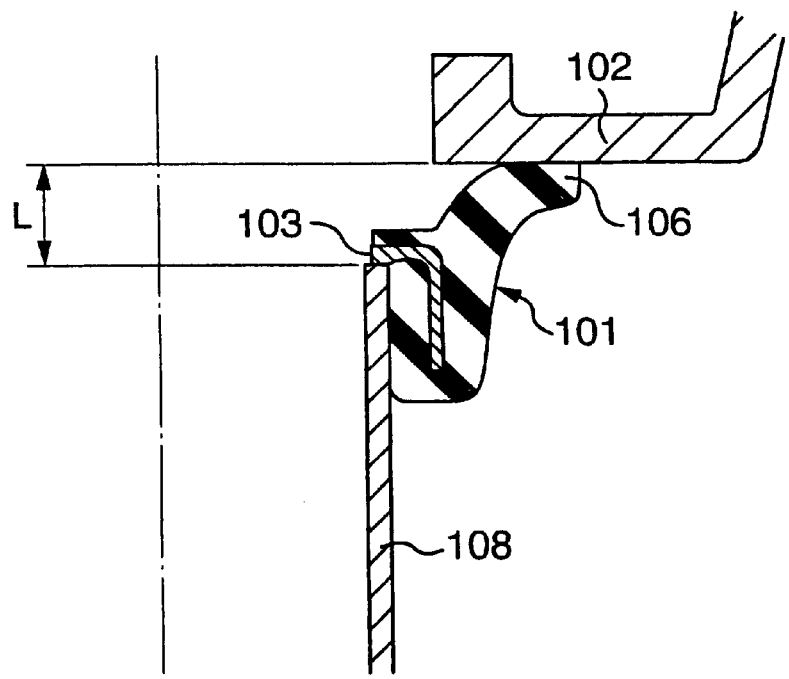
FIG. 6 is a side cross sectional view showing a seal member of the prior art.
Figure 7:
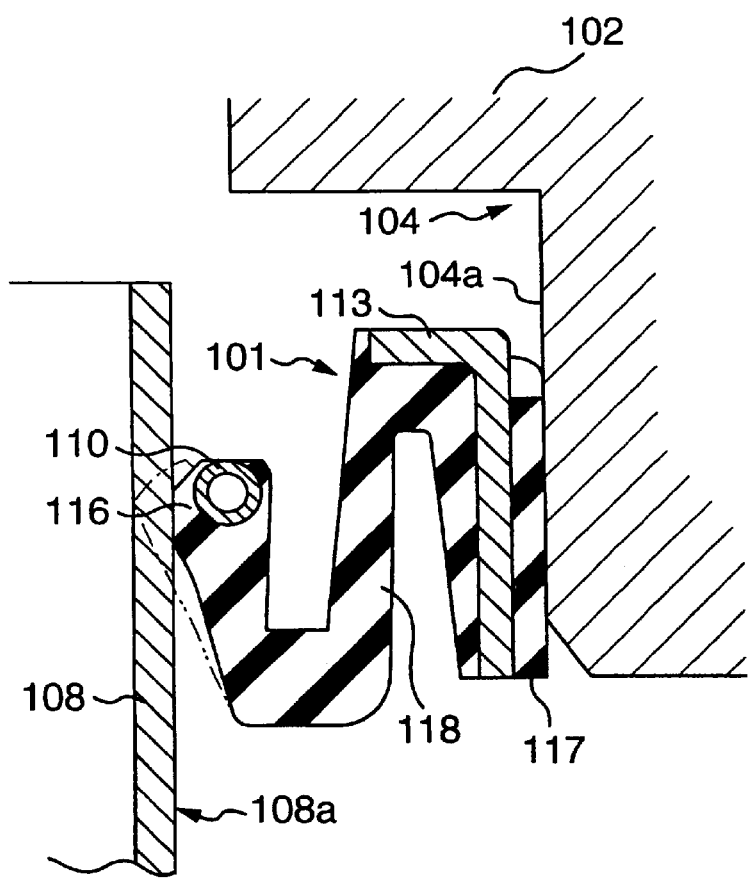
FIG. 7 is a side cross sectional view showing another seal member of the prior art.

In a third embodiment shown in FIG. 5, the lip-shaped projection 12 in the first embodiment is omitted and a projection 15A is provided instead of the bump-shaped projections 15. The projection 15A is a lip-shaped projection inclined in a radially inward and upward direction. The projection 15A cooperates with the first seal portion 6, which extends outwardly downwards, to improve sealing performance, coping with both of the cases where pressure in the cylinder head cover 2 becomes positive and negative relative to the atmospheric pressure. The projection 15A may be an annular projection continuing circumferentially of the mount portion 7 or a plurality of lip-shaped projections spaced from one another circumferentially of the mount portion 7. That is, the projection 15A may be an annular projections continuing circumferentially or annular projections discontinuing circumferentially.

As will be apparent from the foregoing description, the seal member according to the invention can be made compact as a whole because of being devoid of a bellows portion provided in conventional seal members to accommodate eccentricity of an ignition plug tube. Further, when the ignition plug tube is rendered eccentric, the second seal portion is elastically deformed and the mount portion moves radially, whereby it is possible to accommodate eccentricity while maintaining the sealing performance. Furthermore, since the baffle plate is utilized as a part of elements for holding the seal member interposed therebetween, there is no need of providing any newly additional fixation device or the like. This improves workability in manufacture and assembly and leads to reduction in cost.

Although the foregoing description has been made on embodiments of the invention, it is apparent for those skilled in the art that various changes and modifications may be made in the invention within the spirit of the invention and the scope of the appended claims.

What is claimed is:

1. A seal member mounted between a cylinder head cover and an ignition plug tube, comprising:

a mount portion formed to be at least partially smaller in diameter than an inner diameter of a peripheral surface of an annular stepped portion formed around an opening of the cylinder head cover for insertion of the ignition plug tube, the mount portion being interposed between an upper surface of the annular stepped portion and a baffle plate fused to an underside of the cylinder head cover to be radially movable;

a first annular seal portion projecting radially outward from the mount portion contacting with the peripheral surface of the annular stepped portion; and a second annular seal portion projecting radially inward from the mount portion contacting with a peripheral surface of the ignition plug tube to be elastically deformable following relative radial movements between the mount portion and the ignition plug tube.

2. The seal member according to claim 1, wherein the second seal portion is reinforced near an outer peripheral portion thereof with a reinforcement ring.

3. The seal member according to claim 1, wherein the first seal portion is formed to have a shape of a lip.

4. The seal member according to claim 1, wherein a circumferentially continuous projection or circumferentially discrete projections are formed on an end of the mount portion located on the side of the baffle plate contacting with the baffle plate.

5. The seal member according to claim 1, wherein an inner peripheral surface of the mount portion is fitted onto a circumferentially continuous annular projection or circumferentially discrete annular projections extending inwardly of the cylinder head cover from the upper surface of the annular stepped portion.

6. The seal member according to claim 2, wherein an inner peripheral surface of the mount portion is fitted onto a circumferentially continuous annular projection or circumferentially discrete annular projections extending inwardly of the cylinder head cover from the upper surface of the annular stepped portion.

7. The seal member according to claim 3, wherein an inner peripheral surface of the mount portion is fitted onto a circumferentially continuous annular projection or circumferentially discrete annular projections extending inwardly of the cylinder head cover from the upper surface of the annular stepped portion.

8. The seal member according to claim 4, wherein an inner peripheral surface of the mount portion is fitted onto a circumferentially continuous annular projection or circumferentially discrete annular projections extending inwardly of the cylinder head cover from the upper surface of the annular stepped portion.

9. The seal member according to claim 1, wherein a circumferentially continuous annular projection or circumferentially discrete annular projections are formed on an upper end of the mount portion contacting with the cylinder head cover.

* * * * *